(12) United States Patent
Chalk et al.

(10) Patent No.: US 12,416,772 B2
(45) Date of Patent: Sep. 16, 2025

(54) INTERMITTENTLY BONDED OPTICAL FIBER RIBBON WITH JOINING RIBBON MATRICES

(71) Applicant: CORNING RESEARCH & DEVELOPMENT CORPORATION, Corning, NY (US)

(72) Inventors: Julie Ann Chalk, Hickory, NC (US); David Wesley Chiasson, Edmonton (CA); Jeffrey Dean Danley, Hickory, NC (US); Gregory Alan Mills, Clemmons, NC (US); Zhaoxu Tian, Hickory, NC (US); Bin Yang, Shenzhen (CN)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 168 days.

(21) Appl. No.: 18/136,002

(22) Filed: Apr. 18, 2023

(65) Prior Publication Data

US 2023/0258905 A1    Aug. 17, 2023

Related U.S. Application Data

(63) Continuation of application No. PCT/US2021/056402, filed on Oct. 25, 2021.

(60) Provisional application No. 63/107,006, filed on Oct. 29, 2020.

(51) Int. Cl.
*G02B 6/44* (2006.01)

(52) U.S. Cl.
CPC ..................... *G02B 6/448* (2013.01)

(58) Field of Classification Search
CPC ...................................... G02B 6/448
USPC .......................................... 385/114
See application file for complete search history.

(56) References Cited

U.S. PATENT DOCUMENTS

| | | | |
|---|---|---|---|
| 7,039,282 B2 | 5/2006 | Chiasson et al. | |
| 10,330,876 B2 | 6/2019 | Chiasson et al. | |
| 2002/0197032 A1 | 12/2002 | Conrad et al. | |
| 2003/0119934 A1* | 6/2003 | Hu | C08G 18/672 522/90 |
| 2005/0226573 A1* | 10/2005 | Okuno | G02B 6/02004 385/114 |

(Continued)

FOREIGN PATENT DOCUMENTS

| | | |
|---|---|---|
| JP | 2012-027129 A | 2/2012 |
| JP | 2012-027130 A | 2/2012 |

(Continued)

OTHER PUBLICATIONS

International Search Report and Written Opinion of the International Searching Authority; PCT/US2021/056402; dated Jan. 21, 2022; 10 pages; US Patent Office.

(Continued)

*Primary Examiner* — Jerry M Blevins
(74) *Attorney, Agent, or Firm* — William D. Doyle

(57) ABSTRACT

The present disclosure relates to an optical fiber ribbon in which the optical fibers of the optical fiber ribbon are intermittently bonded together at bonding regions along the length of the optical fiber ribbon. The bonding regions of the optical fiber ribbon each include a joining ribbon matrix that have different colors along the length of the optical fiber ribbon.

20 Claims, 7 Drawing Sheets

(56) References Cited

U.S. PATENT DOCUMENTS

| | | | |
|---|---|---|---|
| 2016/0299310 A1 | 10/2016 | Kaneko et al. | |
| 2017/0299829 A1* | 10/2017 | Hoshino | G02B 6/44384 |
| 2018/0156996 A1* | 6/2018 | Iwaguchi | B32B 5/26 |
| 2018/0273427 A1 | 9/2018 | Tanaka et al. | |
| 2019/0285823 A1* | 9/2019 | Tanaka | G02B 6/4482 |
| 2020/0142144 A1 | 5/2020 | Blazer et al. | |
| 2021/0271040 A1* | 9/2021 | Sahoo | G02B 6/4403 |
| 2021/0286143 A1* | 9/2021 | Kondapalli | G02B 6/448 |
| 2022/0075134 A1* | 3/2022 | Sato | G02B 6/4403 |
| 2022/0252809 A1* | 8/2022 | Sato | G02B 6/448 |

FOREIGN PATENT DOCUMENTS

| | | |
|---|---|---|
| JP | 2014-228689 A | 12/2014 |
| WO | 2017/122665 A1 | 7/2017 |
| WO | 2019/011418 A1 | 1/2019 |
| WO | 2021/133534 A1 | 7/2021 |
| WO | 2022/039952 A1 | 2/2022 |

OTHER PUBLICATIONS

Extended European search report, EP application No. 21887242.2, dated Jan. 2, 2025, 16 pages, European Patent Office.

\* cited by examiner

INTERMITTENTLY BONDED OPTICAL FIBER RIBBON WITH JOINING RIBBON MATRICES

CROSS-REFERENCED TO RELATED APPLICATIONS

This application is a continuation of International Application No. PCT/US2021/056402 filed Oct. 25, 2021, which claims the benefit of priority of U.S. Provisional Application Ser. No. 63/107,006 filed on Oct. 29, 2020, the content of which is relied upon and incorporated herein by reference in its entirety.

FIELD OF THE DISCLOSURE

This disclosure relates to optical fiber ribbons, and more particularly, to optical fiber ribbons in which the optical fibers are intermittently bonded together along the length of the optical fiber ribbon and include joining ribbon matrices.

BACKGROUND OF THE DISCLOSURE

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or the field (e.g., using a "field-installable" fiber optic connector).

A single optical fiber cable may contain many optical fibers (indeed, hundreds of optical fibers), and during installation of a fiber optic cable network, managing the connections between the optical fibers can be difficult. Thus, various portions of the optical fiber cable, such as individual optical fibers, buffer tubes, or ribbons, may be color coded for the purposes of identification when making such connections. Further, the optical fiber cable may contain optical fibers arranged in ribbons to allow for multiple optical fibers to be fusion spliced together in a single operation.

SUMMARY OF THE DISCLOSURE

The present disclosure relates to an optical fiber ribbon in which the optical fibers of the optical fiber ribbon are intermittently bonded together at bonding regions along the length of the optical fiber ribbon. The bonding regions of the optical fiber ribbon each include a joining ribbon matrix that have different colors along the length of the optical fiber ribbon.

In one embodiment, an optical fiber ribbon is provided. The optical fiber ribbon comprising: a plurality of optical fibers arranged adjacently to each other, wherein the plurality of optical fibers have a combined width; a plurality of bonding regions intermittently spaced along a length of the optical fiber ribbon, wherein at each bonding region, at least one bond is formed between two optical fibers of the plurality of optical fibers; the plurality of bonding regions comprising: a plurality of joining ribbon matrices spanning at least one of the plurality of bonding regions and spanning the combined width of the plurality of optical fibers, where one of the plurality of joining ribbon matrices is applied onto one of the plurality of bonding regions; wherein at least one of the plurality of joining ribbon matrices has a different color than other joining ribbon matrices of the plurality of joining ribbon matrices; and wherein each joining ribbon matrix of the plurality of joining ribbon matrices has a Young's Modulus of between 1 MPa and 1300 MPa.

In another embodiment, each joining ribbon matrix has an elongation at break between 20% and 200%. In another embodiment, each joining ribbon matrix has a viscosity between 100 centipoise (cP) and 8,000 cP at a temperature of about 25° C. In another embodiment, The optical fiber ribbon of any of claims 1-3, wherein each joining ribbon matrix has a glass transition temperature of between 20° C. and 100° C. In another embodiment, each of the plurality of joining ribbon matrices are spaced apart by a distance between 20 mm and 100 mm along the length of the optical fiber ribbon. In another embodiment, each of the plurality of joining ribbon matrices has an angle with respect to a longitudinal axis of the optical fiber ribbon, the angle ranging between 15° and 90°. In another embodiment, each of the plurality of joining ribbon matrices is sliced into a plurality of ribbon matrix segments, wherein the ribbon matrix segments are spaced apart by an incision width between 10 µm and 150 µm. In another embodiment, the plurality of joining ribbon matrices are symmetric about a longitudinal axis of the optical fiber ribbon. In another embodiment, the plurality of bonding regions comprises a first bonding region, a second bonding region, and a third bonding region; wherein the plurality of joining ribbon matrices comprises a first joining ribbon matrix, a second joining ribbon matrix, and a third joining ribbon matrix; wherein the first joining ribbon matrix is applied onto the first bonding region, the second joining ribbon matrix is applied onto the second bonding region, and the third joining ribbon matrix is applied onto the third bonding region; and wherein the first joining ribbon matrix has a first color and the second joining ribbon matrix and the third joining ribbon matrix have a second color. In another embodiment, the first bonding region comprises bonding between optical fibers resulting in even pairs of the optical fibers, the second bonding region comprises bonding between optical fibers resulting in odd pairs of the optical fibers, and the third bonding region comprises bonding between optical fibers resulting in even pairs of the optical fibers. In another embodiment, the first bonding region comprises bonding between optical fibers resulting in odd pairs of the optical fibers, the second bonding region comprises bonding between optical fibers resulting in even pairs of the optical fibers, and the third bonding region comprises bonding between optical fibers resulting in odd pairs of the optical fibers. In another embodiment, the joining ribbon matrix comprises a UV curable formulation that includes one or more urethane acrylate oligomers, epoxy acrylate oligomers, one or more acrylate monomers, one or more photo-initiators, an antioxidant, and an additive. In another embodiment, the additive enables the joining ribbon matrices to be transparent at near IR wavelengths or at a wavelength of about 1064 nm.

In one embodiment, a method of preparing ribbon matrix segments of an optical fiber ribbon comprising a plurality of optical fibers and having a plurality of bonding regions intermittently spaced along a length of the optical fiber ribbon is provided. The method comprising: applying a joining ribbon matrix of a plurality of joining ribbon matrices onto each of the plurality of bonding regions; wherein the joining ribbon matrix includes an annotation to indicate where the joining ribbon matrix is to be sliced; slicing the joining ribbon matrix such that optical fibers of the optical fiber ribbon are separated and ribbon matrix segments are formed, wherein slicing is performed by a laser.

In another embodiment, the laser operates at a wavelength between about 193 nm and 10.6 μm. In another embodiment, slicing the joining ribbon matrix creates alternating pairs of optical fibers among the plurality of bonding regions. In another embodiment, each joining ribbon matrix of the plurality of joining ribbon matrices has a Young's Modulus of between 1 MPa and 1300 MPa. In another embodiment, each joining ribbon matrix has an elongation at break between 20% and 200%. In another embodiment, each joining ribbon matrix has a viscosity between 100 centipoise (cP) and 8,000 cP at a temperature of about 25° C. In another embodiment, each joining ribbon matrix has a glass transition temperature of between 20° C. and 100° C. In another embodiment, each of the plurality of joining ribbon matrices are spaced apart by a distance between 20 mm and 100 mm along the length of the optical fiber ribbon. In another embodiment, each of the plurality of joining ribbon matrices has an angle with respect to a longitudinal axis of the optical fiber ribbon, the angle ranging between 15° and 90°. In another embodiment, each of the plurality of joining ribbon matrices is sliced into a plurality of ribbon matrix segments, wherein the ribbon matrix segments are spaced by an incision width between 10 μm and 150 μm. In another embodiment, the plurality of joining ribbon matrices are symmetric about a longitudinal axis of the optical fiber ribbon. In another embodiment, the plurality of bonding regions comprises a first bonding region, a second bonding region, and a third bonding region; wherein the plurality of joining ribbon matrices comprises a first joining ribbon matrix, a second joining ribbon matrix, and a third joining ribbon matrix; wherein the first joining ribbon matrix is applied onto the first bonding region, the second joining ribbon matrix is applied onto the second bonding region, and the third joining ribbon matrix is applied onto the third bonding region; and wherein the first joining ribbon matrix has a first color and the second joining ribbon matrix and the third joining ribbon matrix have a second color. In another embodiment, the first bonding region comprises bonding between optical fibers resulting in even pairs of the optical fibers, the second bonding region comprises bonding between optical fibers resulting in odd pairs of the optical fibers, and the third bonding region comprises bonding between optical fibers resulting in even pairs of the optical fibers. In another embodiment, slicing the plurality of joining ribbon matrices separates even pairs of the optical fibers of the first bonding region, separates odd pairs of the optical fibers of the second bonding region, and separates even pairs of the optical fibers of the third bonding region. In another embodiment, the first bonding region comprises bonding between optical fibers resulting in odd pairs of the optical fibers, the second bonding region comprises bonding between optical fibers resulting in even pairs of the optical fibers, and the third bonding region comprises bonding between optical fibers resulting in odd pairs of the optical fibers. In another embodiment, slicing the plurality of joining ribbon matrices separates odd pairs of the optical fibers of the first bonding region, separates even pairs of the optical fibers of the second bonding region, and separates odd pairs of the optical fibers of the third bonding region.

Additional features and advantages will be set out in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Various embodiments will be clarified by examples in the description below. In general, the present disclosure relates to an optical fiber ribbon in which the optical fibers of the optical fiber ribbon are intermittently bonded together at bonding regions along the length of the optical fiber ribbon. The bonding regions of the optical fiber ribbon each include a joining ribbon matrix that have different colors along the length of the optical fiber ribbon.

Figure 1:
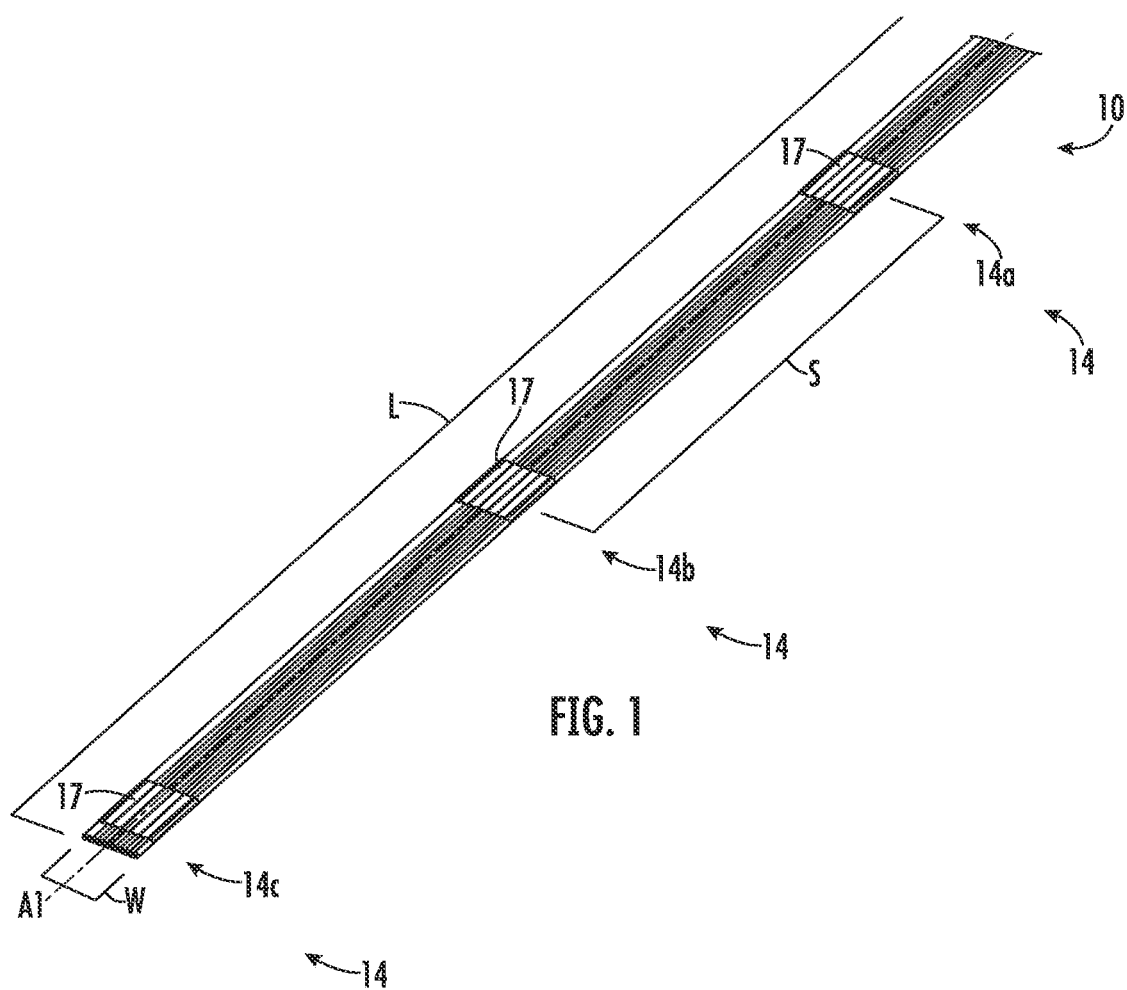
FIG. 1 is a partial, perspective view of an intermittently bonded optical fiber ribbon, according to an embodiment of the present disclosure.

FIG. 1 depicts an exemplary embodiment of an optical fiber ribbon 10 according to the present disclosure. The optical fiber ribbon 10 includes a plurality of optical fibers 12. In the embodiment depicted, the optical fiber ribbon 10 includes twelve optical fibers 12. In embodiments, the number of optical fibers 12 contained in the optical fiber ribbon 10 varies from four to thirty-six. Additionally, in embodiments, the optical fibers 12 may include an outer ink layer, which may further allow for arrangement of the optical fibers 12 in a color-coded pattern. For example, one convention for color-coding the optical fibers 12 is to arrange them in the following color sequence: blue, orange, green, brown, slate, white, red, black, yellow, violet, rose, and aqua. In embodiments containing more than twelve optical fibers 12, the pattern of the optical fiber colors may be repeated. The optical fibers 12 are color-coded in this way to help organize and identify specific individual fibers 12 when making connections or splices. As used herein, the term "optical fiber" can refer to an individual optical fiber 12 or a pairing of optical fibers 12.

In embodiments, the optical fiber ribbon 10 has a first configuration in which the optical fibers 12 are arranged in a substantially planar row, which helps to organize the optical fibers 12 for mass fusion splicing. Further, as will be described more fully below, the optical fibers 12 also can be rolled, curled, or folded into a non-planar configuration (e.g., a circle or spiral) for space-saving packaging in an optical fiber cable, especially optical fiber cables having a circular cross-section. The optical fibers 12 of the optical fiber ribbon 10 are able to transition from the first configuration to the second configuration because the optical fibers 12 are only held together in a particular widthwise order intermittently along the length of the optical fiber 12 by a plurality of intermittent bonding regions 14.

In a conventional optical fiber ribbon, the optical fibers are continuously bonded to each other along their entire length to hold them in the planar configuration. According to the present disclosure, however, the optical fibers 12 are bonded intermittently along the length of the optical fiber ribbon 10 so that the optical fibers 12 are not continuously held to adjacent fibers. The planar configuration of the optical fibers is thus allowed to deform from a planar configuration when the optical fiber ribbon 10 is laterally constrained in some form. In between the intermittent bonding regions 14, the optical fibers 12 are not bonded to each other along their length. In this way, the present optical fiber ribbon 10 provides the advantages of a ribbon with respect to fiber organization and mass fusion splicing while also allowing for a more compact cable design.

FIG. 1 depicts the intermittent bonding regions 14 arranged widthwise across all the optical fibers 12. In embodiments, the bonding regions 14 may be provided on one or both sides of the optical fiber ribbon 10. For example, the bonding regions 14 may be on both sides of the optical fiber ribbon 10 at a particular location along the length, or for example, the bonding regions 14 may alternate sides (e.g., one or more bonding regions 14 on one side of the optical fiber ribbon 10 followed by one or more bonding regions 14 on the opposite side of the optical fiber ribbon 10). Still further, in an example, all of the bonding regions 14 are provided on the same side of the optical fiber ribbon 10.

Bonding region 14 comprises a joining ribbon matrix 17 that is applied onto bonding regions 14 along a length L of optical fiber ribbon 10 and spans bonding region 14 along a width W of optical fiber ribbon 10. Joining ribbon matrix 17 can be applied at any location along length L of optical fiber ribbon 10 and can be sliced into n/2 joining ribbon matrix segments 19 as discussed below where n is the number of optical fibers 12 in optical fiber ribbon 10. In some embodiments, joining ribbon matrix 17 is applied onto bonding regions 14 by ink jet. However, it is within the scope of the present disclosure that in alternate embodiments, joining ribbon matrix is applied by other suitable methods, such as gravure, metered jet, or drop on demand.

Joining ribbon matrix 17 comprises a multi-layer coating having a tough interior material that contacts optical fibers 12 of optical fiber ribbon 10 and having a low friction surface on the exterior side of joining ribbon matrix 17. In some embodiments, joining ribbon matrix 17 comprises a UV curable formulation that includes one or more urethane acrylate oligomers, epoxy acrylate oligomers, one or more acrylate monomers, one or more photo-initiators, an anti-oxidant, and other typical processing additives. In some embodiments, joining ribbon matrix 17 has a Young's modulus between 1 MPa and 1300 MPa or between 1 MPa and 500 MPa. In some embodiments, joining ribbon matrix 17 has an elongation at break between 20% and 200%, between 20% and 150%, or between 100% and 200%. In some embodiments, joining ribbon matrix 17 has a specific gravity of 0.9 to 1.2. In some embodiments, joining ribbon matrix 17 has a viscosity between 100 centipoise (cP) and 8,000 cP at 25° C. In some embodiments, joining ribbon matrix 17 has a glass transition temperature when cured of between 20° C. and 100° C. In some embodiments, joining ribbon matrix 17 has a tensile strength ranging between 10 MPa and 40 MPa. In some embodiments, joining ribbon matrix 17 includes an additive ink coating that allows transparency of joining ribbon matrix 17 at a near IR wavelength or at a wavelength of about 1064 nm to 1100 nm. Additive ink coating is configured to absorb laser beams at the above-mentioned wavelengths, and the transparency of the additive ink coating of joining ribbon matrix 17 allows for a laser setup to be located on either side of optical fiber ribbon 10 if both sides of optical fiber ribbon 10 need to be laser ablated without damaging optical fibers 12 of optical fiber ribbon 10.

Additionally, in embodiments, the bonding regions 14 and joining ribbon matrix 17 can be continuous or discontinuous across the width of the optical fiber ribbon 10. For example, in embodiments, each bonding region 14 and joining ribbon matrix 17 is comprised of one or more bonds holding adjacent optical fibers 12 together with the bonds being contiguous with each other, or in other embodiments, each bonding region 14 and joining ribbon matrix 17 is comprised of one or more bonds holding adjacent optical fibers 12 together without the bonds being contiguous with each other.

In other embodiments, the intermittent bonding regions 14 and joining ribbon matrix 17 may be staggered across subsets of the optical fibers 12 in the optical fiber ribbon 10. For example, within an intermittent bonding region 14 and joining ribbon matrix 17, as few as two of the optical fibers 12 may be bonded together at a particular location along the length of the optical fiber ribbon 10. Notwithstanding the number and location of bonds across the width, the layer of material containing a colorant (described below) may extend across the entire width of the optical fiber ribbon in the bonding region 14 and joining ribbon matrix 17 for identification purposes.

As also shown in FIG. 1, intermittent bonding regions 14 and joining ribbon matrices 17 are spaced apart along length L of optical fiber ribbon 10. In some embodiments, bonding regions 14 and joining ribbon matrices 17 are spaced apart by a distance S ranging between 10 mm and 70 mm, between 15 mm and 60 mm, or between 20 mm and 50 mm. Also, in some embodiments, bonding regions 14 and joining ribbon matrices 17 have a recurring pattern along length L of optical fiber ribbon 10. In some embodiments, recurring pattern includes color coded patterns. For example, in FIG. 1, bonding regions 14 include bonding regions 14a, 14b, and 14c where bonding regions 14a and 14b include joining ribbon matrices 17 that are the same color, and bonding region 14c includes joining ribbon matrix 17 that is a different color. However, it is within the scope of the present disclosure that alternate pattern sequences may be used.

Figure 2:
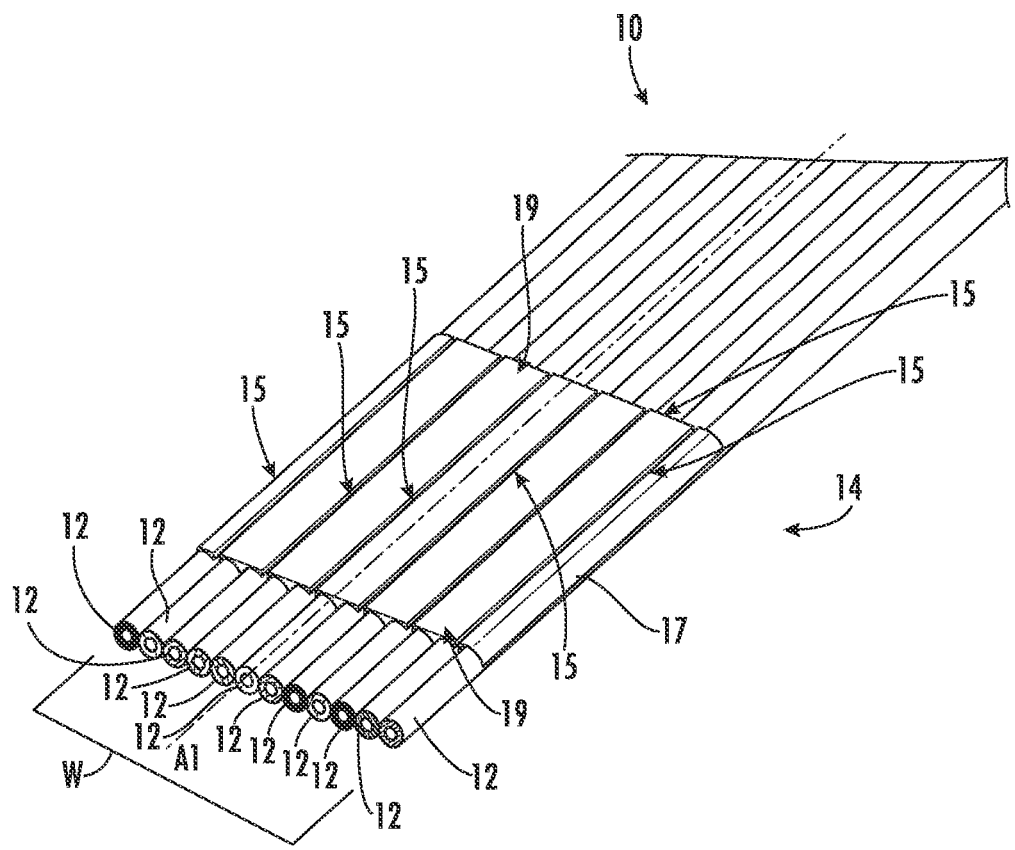
FIG. 2 is an expanded perspective view of a bonding region of the intermittently bonded optical fiber ribbon according to the present disclosure.
Figure 3:
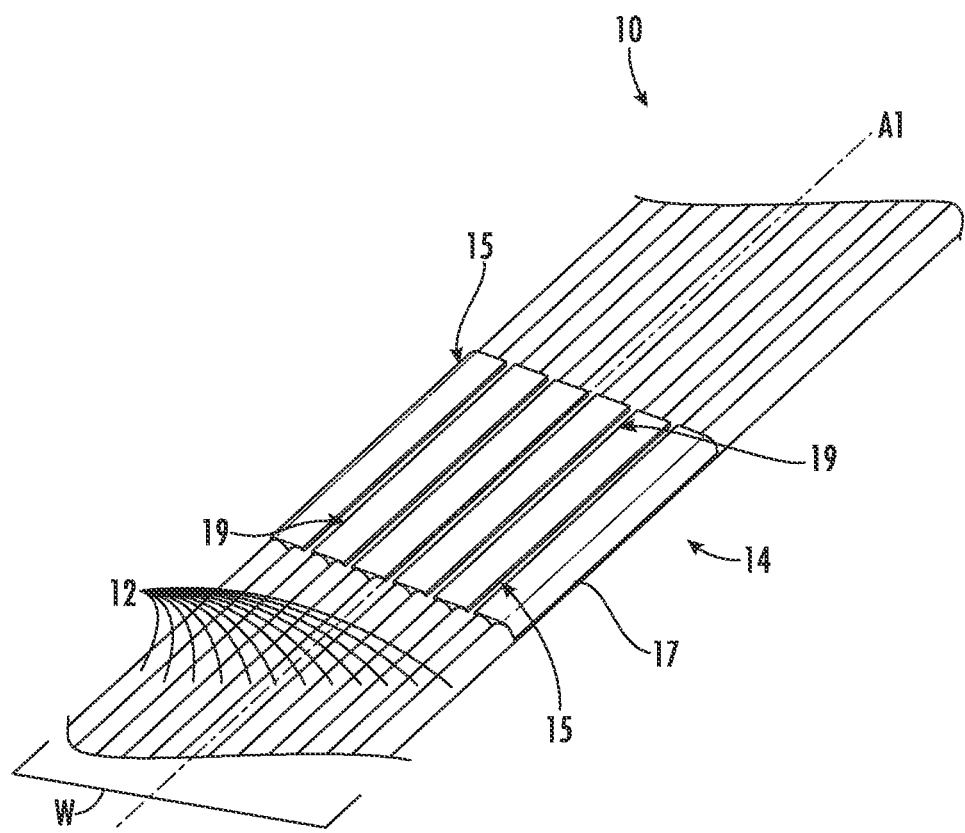
FIG. 3 is an expanded perspective view of another bonding region of the intermittently bonded optical fiber ribbon according to the present disclosure.

As shown in FIGS. 2 and 3, joining ribbon matrices 17 are configured to be sliced by a mechanical slicer (not shown). Referring first to FIG. 2, joining ribbon matrix 17 includes annotations 15 indicating where the mechanical slicer slices joining ribbon matrix 17. As shown, joining ribbon matrix 17 of FIG. 2 has annotations 15 such that even pairs of optical fibers 12 of optical fiber ribbon 10 (ribbon matrix segments 19) are separated when sliced by mechanical splicer. Referring now to FIG. 3, joining ribbon matrix 17 has similar annotations 15 as annotations 15 shown in FIG. 2 except that odd pairs of optical fibers 12 of optical fiber ribbon 10 (ribbon matrix segments 19) are separated when sliced by mechanical splicer. In some embodiments, slicing of joining ribbon matrices 17 at corresponding bonding regions 14a, 14b, 14c alternates between creating even pairs and odd pairs of optical fibers 12 among bonding regions 14. As used herein, "odd pairs" or "odd bonds" of optical fibers refer to pairs of optical fibers 12 where lower numbered optical fibers of optical fiber ribbon 10 are odd (e.g., 1-2, 3-4, etc.) as discussed below. As used herein, "even pairs" or "even bonds" of optical fibers refer to pairs of optical fibers 12 where lower numbered optical fibers of optical fiber ribbon 10 are even (e.g., 2-3, 4-5, etc.) as discussed below.

In some embodiments, slicing of joining ribbon matrices 17 can be done by a laser. In some embodiments, the laser is a laser operating at a wavelength between about 193 nm and 10.6 μm, such as an ultraviolet laser, a $CO_2$ laser, or a laser operating at near IR wavelengths such as Nd:YAG laser, $YVO_4$ laser, Yb fiber laser. With any of these lasers, the laser can be steered with either a galvanometer or polygon or mask projection. In some embodiments, any of these lasers could achieve an incision width E (FIG. 8) of between about 10 μm and 150 μm. In some embodiments, slicing with a laser results in a laser incision that is non-continuous and comprises a plurality of closely spaced apertures. In alternate embodiments, other suitable slicing tools/methods may be used, such as blades or fluid jets. In embodiments where joining ribbon matrix 17 has an additive ink coating as discussed above, transparency from additive ink coating allows for the laser setup to be located on either side of optical fiber ribbon 10 if both sides of optical fiber ribbon need to be laser ablated without damaging optical fibers 12 of optical fiber ribbon 10.

Figure 4A:
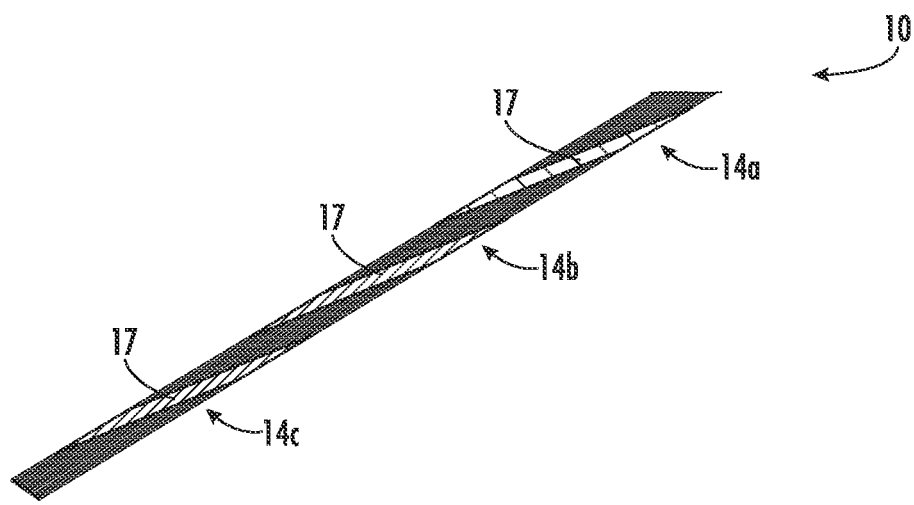
FIGS. 4A and 4B are a partial perspective view and an expanded partial perspective view of another intermittently bonded optical fiber ribbon having alternate bonding regions according to an embodiment of the present disclosure.
Figure 4B:
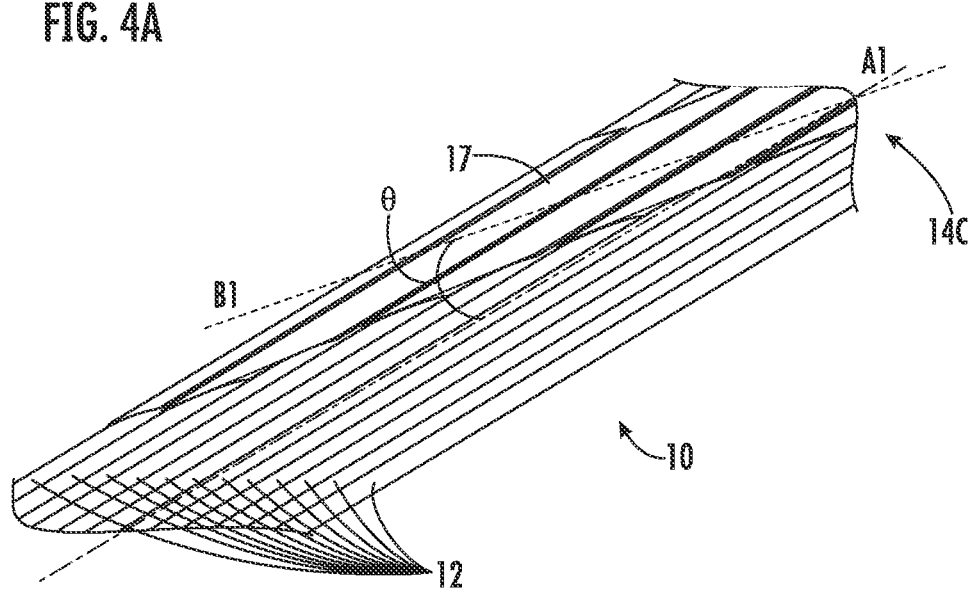
Figure 7:
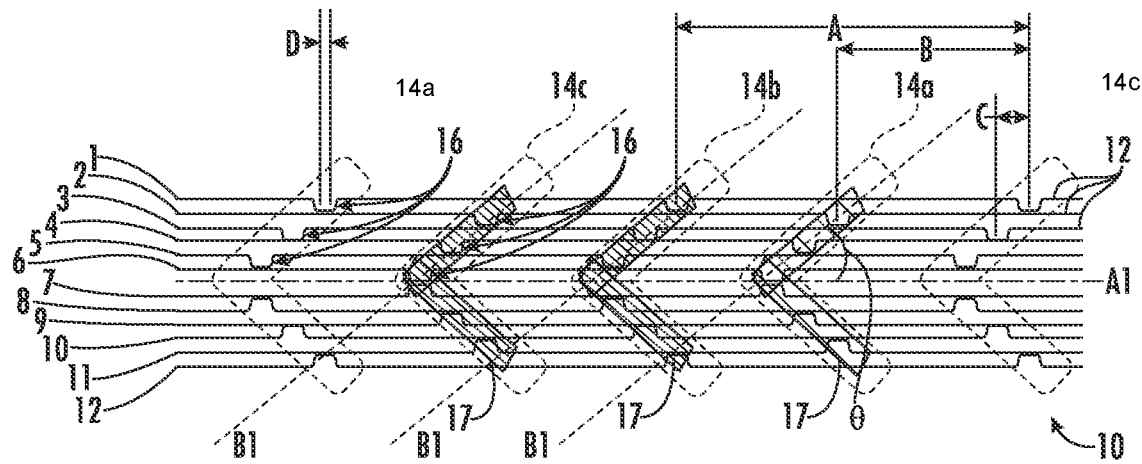
FIG. 7 depicts another pattern for bonding regions of the optical fiber ribbon, according to an embodiment of the present disclosure.

In some embodiments, as shown in FIGS. 4A and 4B, joining ribbon matrices 17 are angled with respect to longitudinal axis A1 of optical fiber ribbon 10. In particular, joining ribbon matrices 17 have an axis B1 that is angled with respect to longitudinal axis A1 at an angle θ where angle θ ranges between 15° and 90°, between 30° and 90°, or between 45° and 90°. In other embodiments, as shown in FIG. 7, bonding regions 14 are in a V shaped pattern that spans the width W of optical fiber ribbon 10. In some embodiments, the V shaped pattern is symmetric about longitudinal axis A of optical fiber ribbon 10. However, it is within the scope of the present disclosure that joining ribbon matrices 17 have a pattern about the width of optical fiber ribbon 10 that is non-symmetrical about longitudinal axis A1 of optical fiber ribbon 10.

Figure 5:
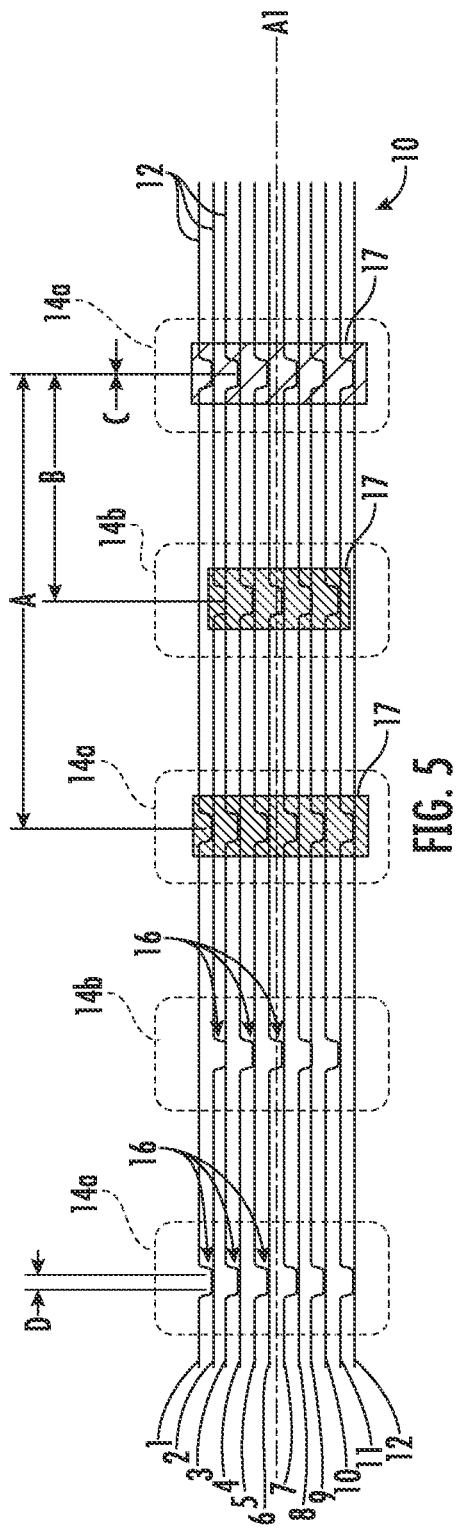
FIG. 5 depicts a pattern for bonding regions of the optical fiber ribbon, according to an embodiment of the present disclosure.
Figure 6:
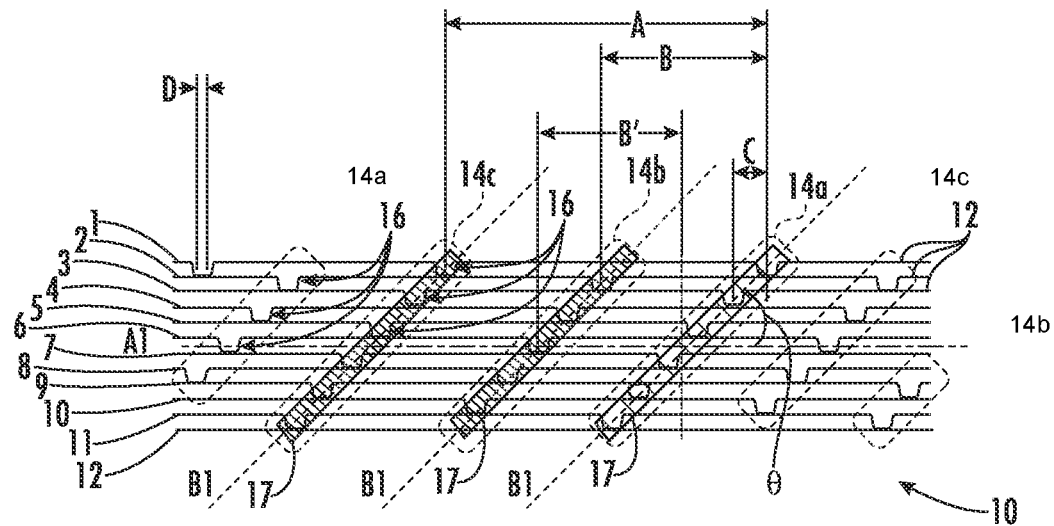
FIG. 6 depicts another pattern for bonding regions of the optical fiber ribbon, according to an embodiment of the present disclosure.

FIGS. 5-7 provide example bonding patterns for bonds 16 between optical fibers 12 of the intermittent bonding regions 14 and example color patterns for joining ribbon matrices 17. For the purposes of describing the bonding patterns in FIGS. 2 and 3, the optical fibers are numbered 1-12 going from top to bottom with respect to the orientation of those figures. For additional reference and as described above, the bonds between optical fibers are referred to as odd or even. In the embodiments depicted in which there are twelve optical fibers, there are eleven bonds between the optical fibers, and thus, the odd bonds are the first (between optical fibers 1-2), third (3-4), fifth (5-6), seventh (7-8), ninth (9-10), and eleventh (11-12). The even bonds are the second (2-3), fourth, (4-5), sixth (6-7), eighth (8-9), and tenth (10-11). The number of bonds varies based on the number of optical fibers. In particular, the number of bonds between optical fibers is one less than the number of optical fibers.

FIGS. 5-7 represent intermittent bonds 16 made between optical fibers 12. The bonds 16 are provided in repeating patterns of bonding regions 14. FIGS. 5-7 depict an alternating bonding pattern of bonding regions 14a, 14b, and 14c, and depict a repeating color pattern of joining ribbon matrices 17 of bonding regions 14a-14c. In particular, the bonding pattern shown has a period of 2 (where adjacent bonding regions 14 alternate between odd and even pairings of optical fibers 12) and the color pattern shown has a period of 3 (where every third joining ribbon matrix 17 repeats the prior color pattern of the previous 3 joining ribbon matrices 17). Moreover, in some embodiments, the color pattern of joining ribbon matrices 17 of bonding regions 14a, 14b, and 14c alternate between odd and even pairs of optical fibers. That is, the subsequent matching color of joining ribbon matrix 17 of bonding region 14a bonds even pairs of optical fibers 12 where joining ribbon matrix 17 of prior bonding region 14a bonds odd pairs of optical fibers 12. In some embodiments, color of joining ribbon matrix 17 can indicate an optical fiber ribbon number of optical fiber ribbon 10 or a group from which optical fiber ribbon 10 came. In particular, in some embodiments, a first color of joining ribbon matrix 17 of bonding region 14a can identify an optical fiber number or an optical fiber ribbon number, and a second color of joining ribbon matrix 17 of bonding region 14b can indicate a group from which optical fiber 12 or optical fiber ribbon 10 came. In embodiments, the bonding regions may have as few as one bond 16 between two optical fibers 12 or as many bonds 16 as the number of optical fibers 12 divided by two (e.g., up to six bonds in a bonding region 14 for twelve optical fibers 12, such as shown in bonding region 14a of FIG. 2).

FIG. 5 depicts an embodiment of a bonding pattern in which the bonds 16 of each bonding region 14 are provided in an alternating pattern of bonding regions 14a, 14b. In the first bonding region 14a, the following odd pairs of optical fibers 12 are bonded to each other: 1-2, 3-4, 5-6, 7-8, 9-10, and 11-12. In the second bonding region 14b, the even pairs of optical fibers 12 are bonded to each other: 2-3, 4-5, 6-7, 8-9, and 10-11. In a third bonding region 14c, the odd pairs of optical fibers 12 are bonded to each other: 1-2, 3-4, 5-6, 7-8, 9-10, and 11-12. As shown, joining ribbon matrix 17 of bonding region 14a has a color that is different than joining ribbon matrices 17 of bonding regions 14b and 14c, and joining ribbon matrices 17 of bonding regions 14b and 14c have the same color. The bonding pattern of bonding regions 14a and 14b is repeated along the length of optical fiber ribbon 10, and the color pattern of joining ribbon matrices 17 of bonding regions 14a, 14b, and 14c are repeated along the length of optical fiber ribbon 10.

FIG. 6 depicts an embodiment in which the bonds 16 of each bonding region 14 are staggered along the length of the optical fibers 12. The bonds 16 between optical fibers 12 are provided in a repeating pattern. In a first bonding region 14a, the following optical fibers 12 are bonded to each other: 1-2, 3-4, 5-6, 7-8, 9-10, and 11-12. In a second bonding region 14b, the following optical fibers 12 are bonded to each other: 2-3, 4-5, 6-7, 8-9, and 10-11. In a third bonding region 14c, the following optical fibers 12 are bonded to each other: 2-3, 4-5, 6-7, 8-9, and 10-11. As shown, joining ribbon matrix 17 of bonding region 14a has a color that is different than joining ribbon matrices 17 of bonding regions 14b and 14c, and joining ribbon matrices 17 of bonding regions 14b and 14c have the same color. The bonding pattern of bonding regions 14a and 14b are repeated along the length of optical fiber ribbon 10, and the color pattern of joining ribbon matrices 17 of bonding regions 14a, 14b, and 14c is repeated along the length of the optical fiber ribbon 10. Within one period of the repeating pattern, each optical fiber 12 is bonded to its one (in the case of edge fibers) or two adjacent optical fibers 12.

FIG. 7 depicts an embodiment in which the bonds 16 of each bonding region 14 are staggered along the length of the optical fibers 12. The bonds 16 between optical fibers 12 are provided in a repeating V-shaped pattern that is symmetric about longitudinal axis A. In a first bonding region 14a, the following even pairs of optical fibers 12 are bonded to each other: 2-3, 4-5, 6-7, 8-9, and 10-11. In a second bonding region 14b, the following odd pairs of optical fibers 12 are bonded to each other: 1-2, 3-4, 5-6, 7-8, 9-10, and 11-12. In a third bonding region 14c, the following even pairs of optical fibers 12 are bonded to each other: 2-3, 4-5, 6-7, 8-9, and 10-11. As shown, joining ribbon matrix 17 of bonding region 14a has a color that is different than joining ribbon matrices 17 of bonding regions 14b and 14c, and joining ribbon matrices 17 of bonding regions 14b and 14c have the same color. The bonding pattern of bonding regions 14a and 14b are repeated along the length of optical fiber ribbon 10, and the color pattern of joining ribbon matrices 17 of bonding regions 14a, 14b, and 14c is repeated along the length of the optical fiber ribbon 10. Within one period of the repeating pattern, each optical fiber 12 is bonded to its one (in the case of edge fibers) or two adjacent optical fibers 12.

As can be seen in FIGS. 5-7, the spacing between bonding regions 14 is denoted by intervals A, B, B', and C. Interval A is the spacing between repeating elements, such as the spacing between a bonding region 14a and the next bonding region 14a. In embodiments, interval A is from 30 mm to 150 mm or from 70 mm to 80 mm. Interval B is the spacing between adjacent even and odd bonds, such as the distance between the bond 1-2 and bond 2-3. In FIG. 5, interval B is the midpoint of interval A, i.e., B=0.5 A, which is 10 mm to 50 mm in embodiments, because the even and odd bonds are alternated. However, in some embodiments, interval B can range between 0.5 A to 0.75 A. In FIG. 6, interval B' is the midpoint of interval A, i.e., B=0.5 A. In FIGS. 6 and 7, interval B is the midpoint as shifted by interval C, which is the distance between even bonds or odd bonds (e.g., distance between bond 1-2 and bond 3-4 or between bond 2-3 and bond 4-5). In embodiments, interval C is from 0 mm to 20 mm. In FIG. 5, interval C is 0 mm because all the odd bonds are in the same bonding region 14a and all the even bonds are in the same bonding region 14b. Thus, in the bonding pattern of FIG. 5, interval B is at the midpoint of interval A (B=0.5 A). In FIGS. 6 and 7, interval C is defined by: 0.5*(A/(units−1))+(A/2), and the bonding pattern is created by shifting each successive odd or even bond by interval C. Thus, the odd and even bonds form a stepped pattern across the bonding regions 14a-14e. In this way, interval B becomes shifted from the midpoint of interval A. In embodiments, interval B is from 0.5 A to 0.75 A when taking into account shifting by interval C. FIGS. 5-7 also depict a dimension D, which is the length of each bond 16. In embodiments, the length D is from 1 mm to 10 mm.

Figure 8:
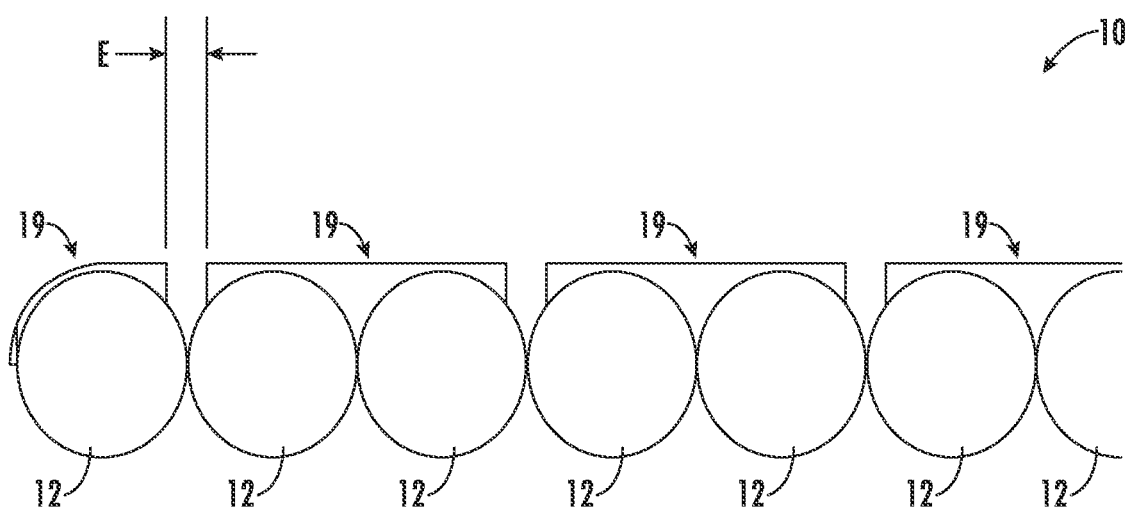
FIG. 8 depicts a longitudinal cross-sectional view of bonds between optical fibers of the optical fiber ribbon, according to another embodiment of the present disclosure.

Referring now to FIG. 8, a distance E is depicted. Distance E represents an incision width between bonded ribbon matrix segments 19 once joining ribbon matrix 17 has been sliced. In some embodiments, distance E ranges between 10 μm and 150 μm.

There are many other alternatives and variations that will be appreciated by persons skilled in optical connectivity without departing from the spirit or scope of this disclosure. For at least this reason, the invention should be construed to include everything within the scope of the appended claims and their equivalents.

What is claimed is:

1. An optical fiber ribbon comprising:
   a plurality of optical fibers arranged adjacently to each other, wherein the plurality of optical fibers have a combined width;
   a plurality of bonding regions intermittently spaced along a length of the optical fiber ribbon, wherein at each bonding region, at least one bond is formed between two optical fibers of the plurality of optical fibers;
   the plurality of bonding regions comprising:
      a plurality of joining ribbon matrices spanning at least one of the plurality of bonding regions and spanning the combined width of the plurality of optical fibers, where one of the plurality of joining ribbon matrices is applied onto one of the plurality of bonding regions;
         wherein at least one of the plurality of joining ribbon matrices has a different color than another joining ribbon matrix of the plurality of joining ribbon matrices; and
         wherein each joining ribbon matrix of the plurality of joining ribbon matrices has a Young's Modulus of between 1 MPa and 1300 MPa;
   wherein the plurality of bonding regions comprises a first bonding region, a second bonding region, and a third bonding region;
   wherein the plurality of joining ribbon matrices comprises a first joining ribbon matrix, a second joining ribbon matrix, and a third joining ribbon matrix;
   wherein the first joining ribbon matrix is applied onto the first bonding region; the second joining ribbon matrix is applied onto the second bonding region, and the third joining ribbon matrix is applied onto the third bonding region; and
   wherein the first bonding region comprises bonding between optical fibers resulting in even pairs of the optical fibers, the second bonding region comprises bonding between optical fibers resulting in odd pairs of the optical fibers, and the third bonding region comprises bonding between optical fibers resulting in even pairs of the optical fibers.

2. The optical fiber ribbon of claim 1, wherein each joining ribbon matrix has an elongation at break between 20% and 200%.

3. The optical fiber ribbon of claim 1, wherein each joining ribbon matrix has a viscosity between 100 centipoise (cP) and 8,000 cP at a temperature of about 25° C.

4. The optical fiber ribbon of claim 1, wherein each joining ribbon matrix has a glass transition temperature of between 20° C. and 100° C.

5. The optical fiber ribbon of any of claim 1, wherein each of the plurality of joining ribbon matrices are spaced apart by a distance between 20 mm and 100 mm along the length of the optical fiber ribbon.

6. The optical fiber ribbon of any of claim 1, wherein each of the plurality of joining ribbon matrices has an angle with respect to a longitudinal axis of the optical fiber ribbon, the angle ranging between 15° and 90°.

7. The optical fiber ribbon of claim 1, wherein each of the plurality of joining ribbon matrices is sliced into a plurality of ribbon matrix segments, wherein the ribbon matrix segments are spaced by an incision width between 10 μm and 150 um.

8. The optical fiber ribbon of claim 1, wherein the plurality of joining ribbon matrices are symmetric about a longitudinal axis of the optical fiber ribbon.

9. The optical fiber ribbon of claim 1,
wherein the first joining ribbon matrix has a first color and the second joining ribbon matrix and the third joining ribbon matrix have a second color.

10. The optical fiber ribbon of claim 1, wherein the first bonding region comprises bonding between optical fibers resulting in odd pairs of the optical fibers, the second bonding region comprises bonding between optical fibers resulting in even pairs of the optical fibers, and the third bonding region comprises bonding between optical fibers resulting in odd pairs of the optical fibers.

11. The optical fiber ribbon of claim 1, wherein the joining ribbon matrix comprises a UV curable formulation that includes one or more urethane acrylate oligomers, epoxy acrylate oligomers, one or more acrylate monomers, one or more photo-initiators, an antioxidant, and an additive.

12. The optical fiber ribbon of claim 11, wherein the additive enables the joining ribbon matrices to be transparent at near IR wavelengths or at a wavelength of about 1064 nm.

13. A method of preparing ribbon matrix segments of an optical fiber ribbon comprising a plurality of optical fibers and having a plurality of bonding regions intermittently spaced along a length of the optical fiber ribbon comprising:
applying a joining ribbon matrix of a plurality of joining ribbon matrices onto each of the plurality of bonding regions;
wherein the joining ribbon matrix includes an annotation to indicate where the joining ribbon matrix is to be sliced;
slicing the joining ribbon matrix such that optical fibers of the optical fiber ribbon are separated and ribbon matrix segments are formed, wherein slicing is performed by a laser, wherein after the slicing, a first bonding region in the plurality of bonding regions comprises bonding between optical fibers resulting in even pairs of the optical fibers, a second bonding region comprises bonding between optical fibers resulting in odd pairs of the optical fibers, and a third bonding region comprises bonding between optical fibers resulting in even pairs of the optical fibers.

14. The method of claim 13, wherein the laser operates at a wavelength between about 193 nm and 10.6 um.

15. The method of claim 13, wherein slicing the joining ribbon matrix creates alternating pairs of optical fibers among the plurality of bonding regions.

16. The method of claim 13, wherein each joining ribbon matrix of the plurality of joining ribbon matrices has a Young's Modulus of between 1 MPa and 1300 MPa.

17. The method of claim 13, wherein each joining ribbon matrix has an elongation at break between 20% and 200%.

18. The method of claim 13, wherein each joining ribbon matrix has a viscosity between 100 centipoise (cP) and 8,000 cP at a temperature of about 25° C.

19. The method of claim 13, wherein each joining ribbon matrix has a glass transition temperature of between 20° C. and 100° C.

20. The method of claim 13, wherein the bonding in the first bonding region, the second bonding region, and the third bonding region is achieved by way of respective pluralities of ribbon matrix segments.

\* \* \* \* \*